United States Patent
Hu et al.

(10) Patent No.: US 9,806,655 B1
(45) Date of Patent: Oct. 31, 2017

(54) SIGNAL GENERATING METHOD FOR ACCURATELY CONTROLLING A MOTOR

(71) Applicants: Xiaofei Hu, Shenzhen (CN); Hongxing Wang, Shenzhen (CN); Yao Wang, Shenzhen (CN)

(72) Inventors: Xiaofei Hu, Shenzhen (CN); Hongxing Wang, Shenzhen (CN); Yao Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/417,014

(22) Filed: Jan. 26, 2017

(30) Foreign Application Priority Data

May 19, 2016 (CN) .......................... 2016 1 0333216

(51) Int. Cl.
| | | |
|---|---|---|
| G05B 5/00 | (2006.01) |
| H02H 7/08 | (2006.01) |
| H02P 1/00 | (2006.01) |
| H02P 3/00 | (2006.01) |
| H02P 23/00 | (2016.01) |
| H02P 29/50 | (2016.01) |
| G05D 19/02 | (2006.01) |

(52) U.S. Cl.
CPC ......... *H02P 23/0077* (2013.01); *G05D 19/02* (2013.01); *H02P 29/50* (2016.02)

(58) Field of Classification Search
CPC ............................ H02P 23/0077; H02P 29/50
USPC ........................................................ 318/460
See application file for complete search history.

(56) References Cited

U.S. PATENT DOCUMENTS

| 5,857,986 A * | 1/1999 | Moriyasu | A61H 23/02 273/148 B |
| 2002/0038986 A1* | 4/2002 | Magnussen | H01L 41/0906 310/317 |
| 2011/0115709 A1* | 5/2011 | Cruz-Hernandez | G06F 3/016 345/168 |

* cited by examiner

*Primary Examiner* — Erick Glass
(74) *Attorney, Agent, or Firm* — Na Xu; IPro, PLLC

(57) ABSTRACT

The invention provides a signal generating method for accurately controlling a motor, the method comprises the steps of generating a period compensation signal and a duration compensation signal, can generate a control signal which is more in conformity with the actual vibration condition of the motor, so that the motor can be controlled more accurately.

10 Claims, 3 Drawing Sheets

SIGNAL GENERATING METHOD FOR ACCURATELY CONTROLLING A MOTOR

TECHNICAL FIELD

The present invention relates to the field of motor control, and more particularly, to a signal generating method that can accurately control a motor.

BACKGROUND

Vibrations have become an essential part of people's daily life, most of them are used as a reminder to remind the user of the occurrence of an event. In addition to producing a complex vibration effect by combining with audio and video, the simple vibration gradually has new functions. Reminder is the simplest function, but as people's requirements are getting higher and higher, the function of simple vibration has been expanded, for example, the vibration is used to express different levels of information in terms of the vibration duration. However, due to the limitations of current motor technology and physical devices, it is impossible to accurately control the vibration duration of a vibrating device by a common signal, especially for a very short time, such as 10 ms. Since the vibration part of the vibrating apparatus still vibrates when the signal is over due to inertial reason, the entire vibration duration is not consistent with what required. Additionally, it is inconvenient and difficult to realize monitoring the vibration duration of a motor by equipping with a measuring apparatus such as an accelerometer in a mobile apparatus.

In the existing mobile apparatus, the vibration control of a motor could all be realized by a driving signal. In some cases, the signal has not been processed at all, such that the motor has a performance varying with its own properties, starts to vibrate and attenuate freely, and the vibration duration is completely unable to control, only depending on motor's own properties; in other cases, the signal may be processed somewhat, for example, the voltage is increased when the motor starts to vibrate, and the voltage is increased in the reverse phase when the vibration is over, such that the motor can start to vibrate and stop quickly. Although this approach makes up the defect that the vibration duration cannot be controlled to a certain extent, the motor still cannot be accurately controlled, and there are still some unwanted damped vibrations.

Therefore, it is necessary to provide a new signal generating method that can accurately control a motor.

SUMMARY

An object of the present invention is to provide a signal generating method that can accurately control a motor.

A technical aspect of the present invention is as follows: a signal generating method for accurately controlling a motor, the motor having a control module and a rated total vibration duration t, the control module comprising a signal generating module, a determination unit, and a signal integrating module, the method comprises the following steps:

S1: the signal generating module generates a start signal having a vibration period number A and a driving voltage V1;

S2: the signal generating module generates a stop signal having a vibration period number D and a driving voltage V2;

S3: the determination unit determines whether A is a multiple of 0.5, and if the result is YES, further determines whether the driving voltage V2 is positive or negative; if the result is NO, generates a period compensation signal to compensate A, such that A is a multiple of 0.5, and the period compensation signal has a vibration period number B and a driving voltage V3;

S4: the control module calculates the total vibration period number E of the motor and generates a duration compensation signal having a vibration period C and a driving voltage V4;

the determination unit determines whether E is greater than A+B+D, and if the result is YES, C=E−(A+B+D), where E=t×f, and f is the vibration frequency of the motor;

if the result is NO, C=0;

S5: the signal integrating module generates an integrating signal which integrates the start signal, the stop signal, the period compensation signal and the duration compensation signal to form a driving signal for driving the motor.

Preferably, if the result is YES in the step S3, the determination unit further determines whether A is an integer:

If C=0, when A is an integer, the polarity of the driving voltage V2 is opposite to the polarity of the driving voltage V1;

when A is not an integer, the polarity of the driving voltage V2 is the same as the polarity of the driving voltage V1;

If C≠0, the polarity of the driving voltage V2 is the same as the polarity of the driving voltage V4 in the last half period.

Preferably, if the result is NO in the step S3, the determination unit further determines whether the decimal place of A is less than 0.5:

When C=0, and if the result is YES, B=0.5−decimal place of A, the polarity of the driving voltage V2 is the same as the polarity of the driving voltage V1;

if the result is NO, B=1−decimal place of A, the polarity of the driving voltage V2 is opposite to the polarity of the driving voltage V1;

When C≠0, the polarity of the driving voltage V2 is the same as the polarity of the driving voltage V4 in the last half period.

Preferably, if the result is YES in step S4, the determination unit further determines whether C is a multiple of 0.5, and if the result is NO, the vibration period C of the duration compensation signal need to be compensated, such that C is a multiple of 0.5.

Preferably, the absolute values of the driving voltage V1, the driving voltage V2, and the driving voltage V3 may be the same or different.

Preferably, the method further comprises the step of selecting filling waveform for the start signal, the stop signal, the period compensation signal, and the duration compensation signal, respectively.

Preferably, the filling waveform includes a sine wave, a square wave, a sawtooth wave, or a triangular wave.

Preferably, the waveforms of the start signal, the stop signal, the period compensation signal, and the duration compensation signal may be the same or different.

Preferably, the method further comprises the step of performing filtering process for the start signal, the stop signal, the period compensation signal, and the duration compensation signal, respectively.

Preferably, the vibration frequency f of the motor is the resonant frequency $f_0$ of the motor.

The invention has the following advantage: in the signal generating method according to the present invention, a duration compensation signal and a period compensation signal are introduced, and a control signal which is more in conformity with the actual vibration condition of the motor can be generated, so that the motor can be controlled more accurately.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the relevant art(s) to make and use the invention. Embodiments of the invention are described, by way of example only, with reference to the accompanying drawings, in which.

Figure 1:
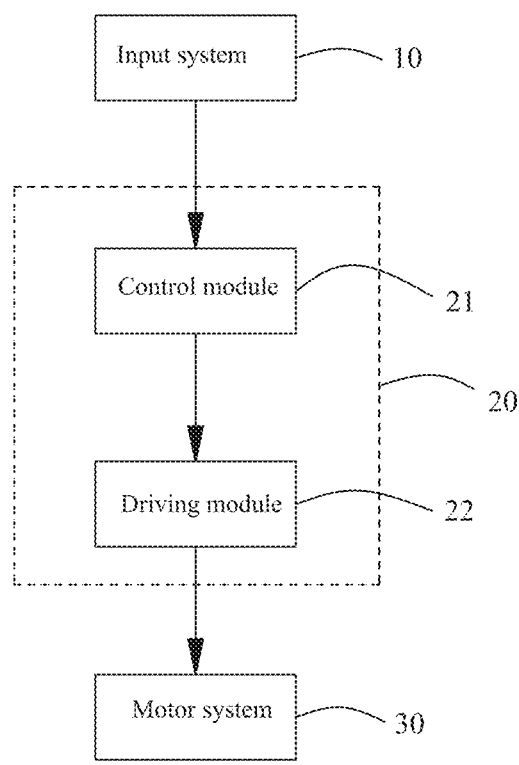
FIG. 1 is a control flow chart of a motor according to the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Some of the embodiments of the present invention will now be described in further detail with reference to the accompanying drawings.

In one embodiment of the present invention, as shown in FIG. 1, the driving signal of a motor is usually generated by two systems, that is, the input system 10 and the control system 20. The input system 10 will generate a signal when an event or request occurs and transmit the signal to the control system, the signal containing all information on the event. The event may be a not-real-time-operating event such as an alarm time being reached, calendar reminder, etc., or may be a real-time-operating event such as a user launching an APP or opening a video or game, etc., or may be a non-manual operation triggered by a section of scene in the video, or even may be a design-related operation such as a user customizing the vibration sense of motor, duration, etc., all of which can be regarded as event. The function of the input system 10 is to record this information and send them to the control system 20.

The control module 21 in the control system 20 receives the information and starts to analyze and process. The analysis and processing in the control module 21 include several aspects, including a signal generating module for generating various signals, a determination unit for logic decision, and a signal integrating module for integrating signals. The signal generating method described in the invention may be included in the control module 21, and the signal generating method will be described later in detail.

The control module 21 generates a signal and sends it to the drive module 22. The drive module 22 processes the received information as a signal that can directly drive the motor and sends it to the motor system 30 so that the motor starts to vibrate. The generated drive signal may be stored in the system memory as a self-defined signal, or may not be stored, and the stored drive signal can be reused again.

Figure 2:
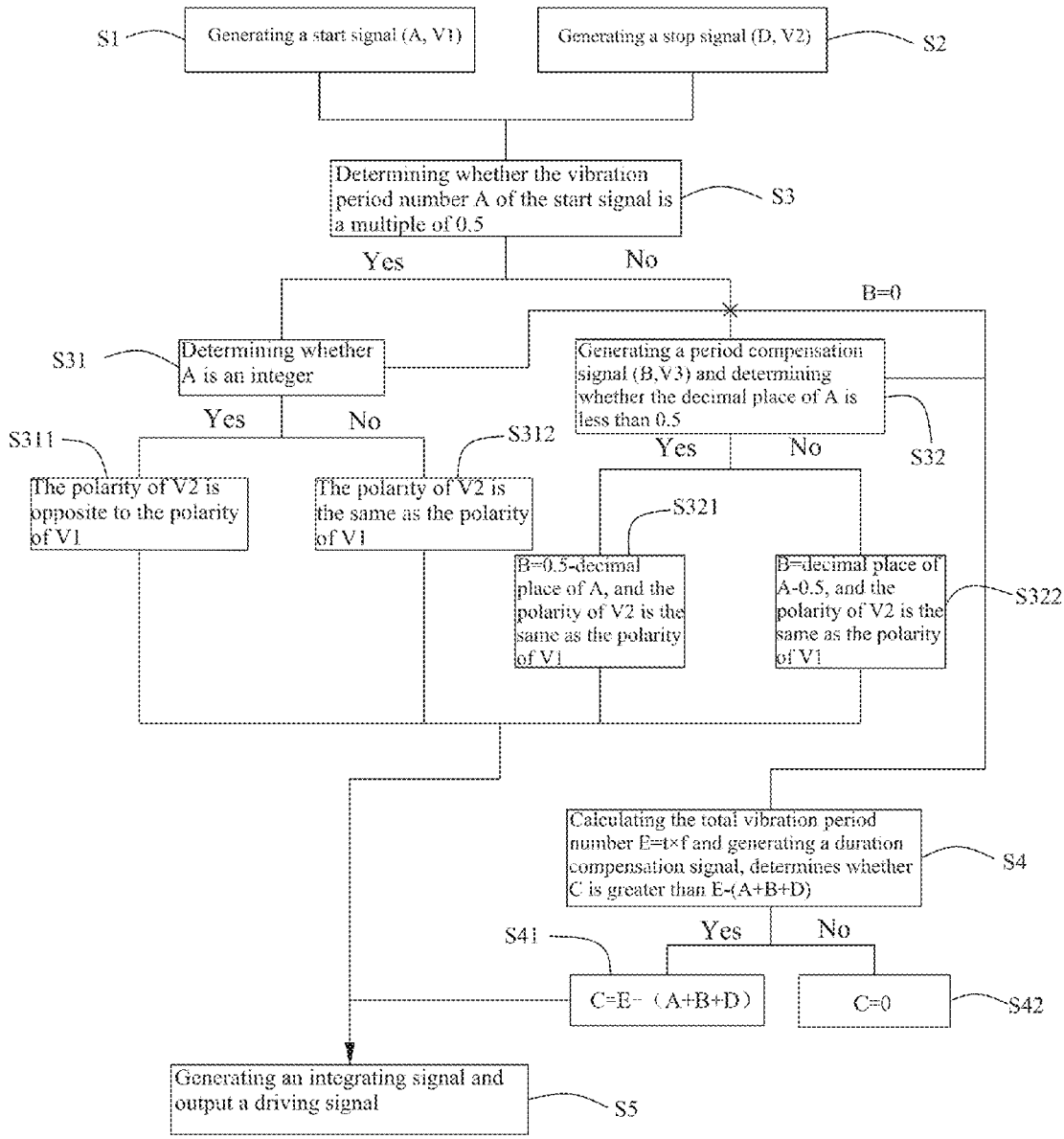
FIG. 2 is a flow chart of a signal generating method that can accurately control a motor according to the present invention.

In one embodiment of the present invention, as shown in FIG. 2, the signal generating method of the present invention roughly includes the following steps (note that there is no strict sequential relationship between steps), and some parameters of the motor are known before the motor vibrates, such as the total vibration duration t of the motor, the vibration frequency of the motor, the vibration sense corresponding to an event or required by an operation, and a driving voltage:

S1: the signal generating module generates a start signal. The start signal contains two primary parameters, one is the vibration period number A, the other is the driving voltage V1, and the start signal is represented by (A, V1) in FIG. 1. Wherein, A=vibration duration in starting phase×vibration frequency of motor. In the present invention, the vibration frequency of the motor may be the vibration frequency $f_0$ of the motor, or may be any frequency close to or far from the resonance frequency.

The function of the start signal is to drive the motor to vibrate from rest with an acceleration, which is closely related to the vibration sense that the motor can achieve. The vibration sense can be measured in terms of acceleration, and the vibration sense is already known at the beginning of the design (different events or requests require different vibration senses), so the value of A can be obtained from the table showing the correspondence of the vibration sense and the voltage and the period number. The correspondence table is derived from some sets of experimental data. More specifically, a motor to be utilized in the apparatus can be tested, and the amplitude and duration of the driving voltage can be changed, so as to obtain the value of acceleration. The correspondence table records the acceleration derived from the value of voltage and the vibration period number. Therefore, the combination of the driving voltage and the vibration period number corresponding to the value of acceleration can be inversely queried by the known value of acceleration.

S2: the signal generating module generates a stop signal. Likely, the stop signal contains two primary parameters, one is the vibration period number D, the other is the drive voltage V2, and the stop signal is represented by (D, V2) in FIG. 1. Normally, in the case that the vibration period number A of the start signal is known, there must be an optimum D value associated therewith. The optimal D value is usually the D value corresponding to the acceleration closest to zero during the stop procedure.

S3: the determination unit determines whether A is a multiple of 0.5, wherein, 0.5 is a half period.

Figure 3A:
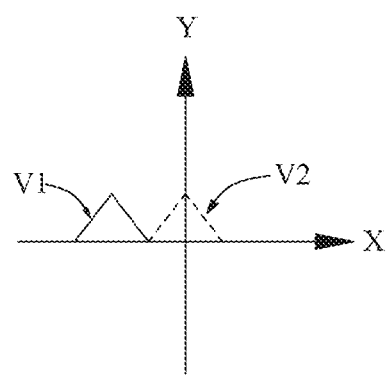
FIG. 3a is a diagram showing the correspondence between the voltage V1 of the start signal and the voltage V2 of the stop signal when A is a multiple of 0.5 and A is not an integer in the signal generating method of the present invention.
Figure 3B:
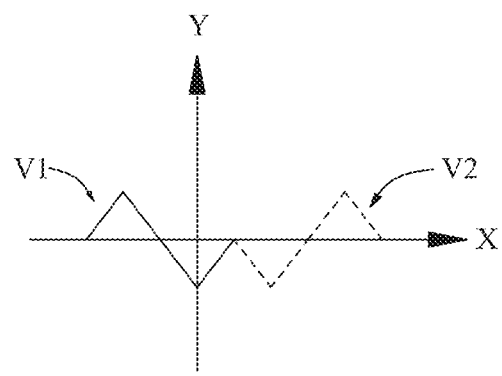
FIG. 3b is a diagram showing the correspondence between the voltage V1 of the start signal and the voltage V2 of the stop signal when A is a multiple of 0.5 and A is an integer in the signal generating method of the present invention.

If A is a multiple of 0.5, it means that there is no need to compensate for the period number, and no period compensation signal is generated, B=0. At this point, we need to make the next determination:

S31: it is determined whether A is an integer. If A is not an integer, the polarity of the voltage value of V2 is the same as the polarity of V1. This is because when A is not an integer, as shown in FIG. 3a, A=0.5, if the motor needs to be stopped, the vibration period and vibration direction of D need to be the same as A, otherwise, the motor will continue to vibrate toward the negative direction of the Y axis after the motor has vibrated for 0.5 periods. If A is an integer, the polarity of the voltage value of V2 is opposite to the polarity of V1. Similarly, this is because when A is an integer, as shown in FIG. 3b, A=1, if the motor needs to be stopped, the vibration period and vibration direction of D need to be opposite to A, otherwise, the motor will continue to vibrate toward the positive direction of the Y axis after the motor has vibrated for 1 period.

If A is not a multiple of 0.5, it means that the period number needs to be compensated to be a multiple of 0.5, while the signal generating module will generate a period compensation signal (B, V3). At this point, we need to make the next determination:

S32: the determination unit determines whether the decimal place of A is less than 0.5. If the decimal place of A is less than 0.5, B=0.5−decimal place of A, and the polarity of V2 are the same as the polarity of V1. If the decimal place of A is greater than 0.5, B=1−decimal place of A, the polarity of V2 is opposite to the polarity of V1. The function of the period compensation signal is to complement the vibration period, such that the vibration period is a multiple of 0.5, while directions of V2 and V1 are the same as the case when A is a multiple of 0.5 and will not be described in detail here.

S4: the control module calculates the total vibration period number E and generates a duration compensation signal. The total vibration period number E=t×f, where t is the total vibration duration of the motor, and the duration compensation signal has the period number C and the driving voltage V4.

The determination unit determines whether E is greater than A+B+D, if the result is YES, it means that the actual vibration period number (A+B+D) is shorter than the expected vibration period number E, therefore, it is necessary to introduce a duration compensation signal to complement the actual vibration period number, and at this point, the vibration period number of the duration compensation signal C=E−(A+B+D). If E is less than A+B+D, it means that the actual vibration period number is greater than the expected vibration period number E and does not need to be complemented, therefore, C=0. It should be noted that determinations for polarities of V1 and V2 are all based on the case of C=0, and in the case that C is not equal to 0, the polarity of the driving voltage V2 are the same as the polarity of the driving voltage V4 in the last half period.

At this point, in the case that C is not equal to 0, it can be further determined whether C is a multiple of 0.5. Like A, if C is not a multiple of 0.5, C needs to be complemented such that C is a multiple of 0.5. C can be rounded, or C can be filled unconditionally such that C is a multiple of 0.5, or the value of C can be decreased such that C is a multiple of 0.5.

S5: the signal integrating module generates an integrating signal which is a driving signal that integrates the start signal, the stop signal, the period compensation signal and the duration compensation signal according to a splicing rule, and finally forms a driving signal for driving the motor.

It is also possible to separately select filling waveforms for the start signal, the stop signal, the period compensation signal, and the duration compensation signal, respectively, before outputting the final driving signal. The filling waveforms include sine wave, square wave, sawtooth wave or triangular wave, and the waveform of the four signals may be the same or different. Then, the signal is processed according to whether filtering or filtering algorithm is required, and the signal processing is independent.

It is to be noted that the absolute values of V1, V2 and V3 mentioned above may be the same or different.

In the signal generating method according to the present invention, a duration compensation signal and a period compensation signal are introduced, and a control signal which is more in conformity with the actual vibration condition of the motor can be generated, so that the motor can be controlled more accurately.

While the foregoing is merely an embodiment of the invention, it should be noted that modifications may be made thereto by those skilled in the art without departing from the scope of the inventive concept, yet all such modifications fall within the scope of the invention.

What is claimed is:

1. A signal generating method for accurately controlling a motor which has a control module and a rated total vibration duration t, the control module comprising a signal generating module, a determination unit, and a signal integrating module, wherein the method comprises the following steps of:

S1: generating, by the signal generating module, a start signal having a vibration period number A and a driving voltage V1;

S2: generating, by the signal generating module, a stop signal having a vibration period number D and a driving voltage V2;

S3: determining, by the determination unit, whether A is a multiple of 0.5, and if the result is YES, further determining whether the driving voltage V2 is positive or negative; if the result is NO, generating a period compensation signal to compensate A, such that A is a multiple of 0.5, wherein the period compensation signal has a vibration period number B and a driving voltage V3;

S4: calculating, by the control module, the total vibration period number E of the motor, and generating a duration compensation signal having a vibration period C and a driving voltage V4;

the determination unit determines whether E is greater than A+B+D, and if the result is YES, C=E−(A+B+D), wherein E=t×f, and f is the vibration frequency of the motor;

if the result is NO, C=0;

S5: generating, by the signal integrating module, an integrating signal which integrates the start signal, the stop signal, the period compensation signal and the duration compensation signal to form a driving signal for driving the motor.

2. The signal generating method according to claim 1, wherein, if the result is YES in the step S3, further determining, by the determination unit, whether A is an integer:

If C=0,
the polarity of the driving voltage V2 is opposite to the polarity of the driving voltage V1 when A is an integer;
the polarity of the driving voltage V2 is the same as the polarity of the driving voltage V1 when A is not an integer;

If C≠0, the polarity of the driving voltage V2 is the same as the polarity of the driving voltage V4 in the last half period.

3. The signal generating method according to claim 1, wherein, if the result is NO in the step S3, further determining, by the determination unit, whether the decimal place of A is less than 0.5:

When C=0, and
if the result is YES, B=0.5−decimal place of A, and the polarity of the driving voltage V2 is the same as the polarity of the driving voltage V1;
if the result is NO, B=1−decimal place of A, and the polarity of the driving voltage V2 is opposite to the polarity of the driving voltage V1;

When C≠0, the polarity of the driving voltage V2 is the same as the polarity of the driving voltage V4 in the last half period.

4. The signal generating method according to claim 1, wherein, if the result is YES in step S4, further determining, by the determination unit, whether C is a multiple of 0.5, and if the result is NO, the vibration period C of the duration compensation signal need to be compensated, such that C is a multiple of 0.5.

5. The signal generating method according to claim 1, wherein, the absolute values of the driving voltage V1, the driving voltage V2, and the driving voltage V3 may be the same or different.

6. The signal generating method according to claim 1, wherein, the method further comprises the step of selecting filling waveform for the start signal, the stop signal, the period compensation signal, and the duration compensation signal, respectively.

7. The signal generating method according to claim 6, wherein, the filling waveform includes a sine wave, a square wave, a sawtooth wave, or a triangular wave.

8. The signal generating method according to claim 6, wherein, the waveforms of the start signal, the stop signal, the period compensation signal, and the duration compensation signal may be the same or different.

9. The signal generating method according to claim 1, wherein, the method further comprises the step of performing filtering process for the start signal, the stop signal, the period compensation signal, and the duration compensation signal, respectively.

10. The signal generating method according to claim 1, wherein, the vibration frequency f of the motor is the resonant frequency $f_0$ of the motor.

* * * * *